United States Patent
Masaki

(10) Patent No.: US 10,344,879 B2
(45) Date of Patent: Jul. 9, 2019

(54) FLAP VALVE APPARATUS

(71) Applicant: PIOLAX, INC., Yokohama-shi (JP)

(72) Inventor: Tomotaka Masaki, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/511,616

(22) PCT Filed: Sep. 24, 2015

(86) PCT No.: PCT/JP2015/076936
§ 371 (c)(1),
(2) Date: Mar. 15, 2017

(87) PCT Pub. No.: WO2016/047690
PCT Pub. Date: Mar. 31, 2016

(65) Prior Publication Data
US 2017/0299074 A1    Oct. 19, 2017

(30) Foreign Application Priority Data

Sep. 26, 2014    (JP) ................................. 2014-196418

(51) Int. Cl.
*F16K 1/20* (2006.01)
*F16K 15/03* (2006.01)
(Continued)

(52) U.S. Cl.
CPC ............ *F16K 15/033* (2013.01); *B60K 15/04* (2013.01); *F16K 1/2028* (2013.01);
(Continued)

(58) Field of Classification Search
CPC ...... F16K 15/033; F16K 15/03; F16K 1/2028; F16K 1/2007; Y10T 137/7902;
(Continued)

(56) References Cited

U.S. PATENT DOCUMENTS 1,635,842 A * 7/1927 Hirshstein ............... F16K 15/03
                                                        137/519
3,888,166 A * 6/1975 Stottmann ............. F23L 11/005
                                                        137/527
(Continued)

FOREIGN PATENT DOCUMENTS

GB              532264 A  *  1/1941  ............... F16K 3/10
JP        S 63-37428 U       3/1988
(Continued)

OTHER PUBLICATIONS

International Search Report (ISR) (PCT Form PCT/ISA/210), in PCT/JP2015/076936, dated Dec. 22, 2015.
(Continued)

*Primary Examiner* — Reinaldo Sanchez-Medina
*Assistant Examiner* — Nicole Gardner
(74) *Attorney, Agent, or Firm* — McGinn I.P. Law Group, PLLC

(57) ABSTRACT

A flap valve apparatus includes a main body; a valve body; and a spring member. The main body includes support shafts, and the valve body includes bearing portions. When viewed from the axial direction of the support shaft, the bearing portions has a bearing hole with an inner diameter larger than the outer diameter of the support shaft; and an introduction groove being in communication with the bearing hole from the seal surface side of the valve body. A width of the introduction groove is smaller than the outer diameter of the support shaft, but is expandable to receive the support shaft. When viewed from the axial direction of the support shaft, an opening portion of the introduction grove is positioned near the axial center of the main body.

17 Claims, 9 Drawing Sheets

(51) Int. Cl.
  *B60K 15/04* (2006.01)
  *F16K 27/02* (2006.01)
  *B60K 15/03* (2006.01)

(52) U.S. Cl.
  CPC ............ *F16K 27/0227* (2013.01); *B60K 2015/03269* (2013.01); *B60K 2015/0461* (2013.01)

(58) Field of Classification Search
  CPC ......... Y10T 137/7898; Y10T 137/7903; Y10T 137/7901
  USPC .................................................. 251/291, 299
  See application file for complete search history.

(56) References Cited

U.S. PATENT DOCUMENTS

| | | | | |
|---|---|---|---|---|
| 4,027,696 A * | 6/1977 | Guyton | .................. | F16K 15/03 137/527.4 |
| 5,887,615 A | 3/1999 | Goto et al. | | |
| 6,123,528 A * | 9/2000 | Sun | ....................... | F04C 29/128 137/527 |
| 6,932,100 B2 * | 8/2005 | Martin | .................. | B60K 15/04 137/15.18 |
| 7,549,443 B2 * | 6/2009 | Levey | ................... | B60K 15/04 137/592 |
| 7,568,499 B2 * | 8/2009 | Kishi | ................... | F16K 15/033 137/527 |
| 2008/0257426 A1* | 10/2008 | Spink | .................... | B60K 15/04 137/527 |
| 2010/0126625 A1* | 5/2010 | Berghorst | ............. | B60K 15/04 141/348 |
| 2014/0000739 A1 | 1/2014 | Nomura et al. | | |

FOREIGN PATENT DOCUMENTS

| | | |
|---|---|---|
| JP | H 02-43565 U | 3/1990 |
| JP | H 10-100691 A | 4/1998 |
| JP | H 11-028938 A | 2/1999 |
| JP | 2011-011693 A | 1/2011 |
| JP | 2013-122258 A | 6/2013 |
| JP | 2014-159256 A | 9/2014 |
| WO | WO 2012/124439 A1 | 9/2012 |

OTHER PUBLICATIONS

English translation of International Preliminary Examination Report and Written Opinion (WO) (IPER-II) in PCT/JP2015/076936.

* cited by examiner

FLAP VALVE APPARATUS

TECHNICAL FIELD

The present invention relates to a flap valve device that is mounted on an opening portion of a fuel injection pipe connected to a fuel tank of an automobile or the like, and is suitable for a check valve for preventing backflow of fuel.

BACKGROUND ART

For example, a fuel injection pipe coupled to an oil injection port is connected to a fuel tank of a automobile, and a flap valve device is sometimes provided as a check valve to the fuel injection pipe at its opening on the downstream side. The flap valve is arranged to open to let the fuel flow into the tank during oil feeding, and close after the completion of oil feeding to prevent backflow of the fuel into fuel injection pipe.

As a flap valve device of this conventional type, Patent Document 1 describes a check valve for preventing backflow of fuel that includes a cylindrical case, a bearing portion provided to the case at its end on the downstream side, a valve element integrally including a shaft portion that is pivotally supported by the bearing, and an urging means for urging the valve element in a closing direction toward the opening portion of the case.

The bearing portion is provided to a supporting member that is separate from the case. A clip portion provided to the supporting member is engaged with a flat seat portion provided to the case at its end portion on the downstream side, whereby the clip portion is attached to the case to make the bearing portion disposed at the end portion on the downstream side of the case.

The case is made from metal while the supporting member and the valve element are made from a resin material.

CITATION LIST

Patent Literature

Patent Document 1
JP-H11-028938-A

SUMMARY OF THE INVENTION

Problem that the Invention is to Solve

The check valve for preventing backflow of fuel of Patent Document 1 has a configuration that the resin supporting member is attached to the metallic case, and the valve element is attached in an openable and closable manner to the bearing portion of the supporting member via the shaft portion. Thus, the number of the components may be increased because of the supporting member provided with the bearing portion, resulting in a complicated structure.

If a resin tank made from polyethylene or the like is used, the number of the components can be reduced by making the case of the check valve from a resin such as polyethylene that is weldable to the resin tank to integrally form the bearing portion and the case.

However, the bearing portion integrally formed with the case is increased in inside diameter when the check valve is soaked in the fuel. However, the shaft portion slightly changes in outside diameter in case of the valve element being made from polyoxymethylene (POM) or the like, which is hardly swollen with fuel. Thus, the shaft portion may easily come off from the bearing portion.

An object of the present invention is to provide a flap valve device capable of making a supporting shaft hardly come off from a bearing hole, regardless of the type of materials from which a main body and a valve element are made.

Means for Solving the Problem

To achieve the object described above, the present invention provides
  a flap valve device including:
    a cylindrical-shaped main body including a liquid flow passage formed thereinside;
    a flap-shaped valve element attached in an openable and closable manner to a one-end opening portion of the main body; and
    a spring member arranged to normally urge the valve element in a closing direction toward the one-end opening portion of the main body,
    wherein the main body includes
      a supporting shaft arranged to pivotally support the valve element in an openable and closable manner,
    wherein the valve element includes
      a bearing portion into which the supporting shaft is inserted,
    wherein the bearing portion includes
      a bearing hole into which the supporting shaft is inserted to be supported, and which has an inside diameter larger than an outside diameter of the supporting shaft, when seen from an axial direction of the supporting shaft, and
      a lead groove having an opening portion open to a seal surface side of the valve element, and being in communication with the bearing hole via a communicating passage, the communicating passage having a width smaller than the outside diameter of the supporting shaft and being elastically expandable to thereby allow the supporting shaft to be introduced into the bearing hole, and
    wherein the opening portion of the communicating passage for the bearing hole is positioned closer to an axial center of the main body when seen from the axial direction of the supporting shaft.
  There may be provided
    the flap valve device,
    wherein one end of the bearing portion around the opening portion of the lead groove is coupled to a main body of the valve element, and the other end of the bearing portion around the opening portion of the lead groove is separated from the main body of the valve element,
    wherein there is provided a band-shaped portion that couples the one end of the bearing portion or a portion of the main body of the valve element therearound to the other end of the bearing portion, and
    wherein the band-shaped portion is shaped so as not to obstruct an insertion of the supporting shaft into the lead groove when seen from the seal surface side of the valve element.
  There may be provided
    the flap valve device,
    wherein the supporting shaft of the main body includes a pair of supporting shafts,
    wherein the bearing portion of the valve element includes a pair of bearing portions into which the pair of supporting shafts are inserted, wherein the pair of supporting shafts include protruding portions that are disposed outside of the pair of bearing portions and protrude in radial outer directions with respect to the bearing holes, and wherein the band-shaped portions is shaped to allow the protruding portions pass therethrough when seen from the seal surface side of the valve element, and to prevent the protruding portions from coming off therefrom when the valve element rotationally moves in an opening direction.

There may be provided the flap valve device, wherein the protruding portions extend in an axial direction of the main body toward a downstream side of the liquid flow passage.

There may be provided the flap valve device, wherein the bearing hole has a long hole shape with a long axis in the axial direction of the main body when seen from the axial direction of the supporting shaft in a state where the one-end opening portion of the main body is closed with the valve element.

Advantageous Effects of Invention

With the flap valve device according to the present invention, since the bearing portion of the valve element includes the lead groove that is open to the seal surface side of the valve element, aligning the bearing portion of the valve element with the supporting shaft of the main body to push in the valve element against the main body allows the supporting shaft to pass through the lead groove and the communicating passage to be introduced into the bearing hole, whereby the valve element can be attached in an openable and closable manner to the main body.

Since the supporting shaft is provided to the main body while the bearing hole is provided to the valve element, even when, for example, the main body is made from polyethylene or the like that is easily swollen with fuel while the valve element is made from polyoxymethylene (POM) or the like that is hardly swollen with fuel, and the main body is soaked with fuel to have the supporting shaft swollen, the bearing hole can be prevented from being expanded, and can prevent the supporting shaft from coming off from the bearing hole since the bearing hole has an inside diameter larger than the outside diameter of the supporting shaft.

Since the bearing hole has an inside diameter larger than the outside diameter of the supporting shaft as described above, even when the supporting shaft is swollen, the increase of the friction force between the inner periphery of the bearing hole of the valve element and the outer periphery of the supporting shaft can be inhibited. Thus, smooth opening and closing operation of the valve element can be maintained.

Since the opening of the lead groove to the bearing hole of the communicating passage is, when seen from the axial direction of the supporting shaft, disposed closer to the axial center of the main body, even when the valve element rotationally moves in the opening direction or even when the pressure of fluid is applied on the valve element to exert the force to detach the valve element from the main body on the valve element, needless to say when the valve element is closing the one-end opening portion of the main body, the supporting shaft can be prevented from being pushed against the opening of the lead groove that is open to the bearing hole of the communicating passage. Thus, the supporting shaft can be made to hardly come off from the lead groove.

BRIEF DESCRIPTION OF DRAWINGS

FIG. 3A is a perspective view of the valve element. FIG. 3B is a perspective view of the same seen from a direction different from FIG. 3A.

FIG. 8A is an explanatory view of the flap valve device showing the state where the valve element is closed. FIG. 8B is an explanatory view of the same where the opening angle of the valve element is 30°. FIG. 8C is an explanatory view of the same where the opening angle of the valve element is 58°. FIG. 8D is an explanatory view of the same where a load such as fluid pressure is imposed in the state of FIG. 8B. FIG. 8E is an explanatory view of the same where a load such as fluid pressure is imposed in the state of FIG. 8C.

MODE FOR CARRYING OUT THE INVENTION

Figure 1:
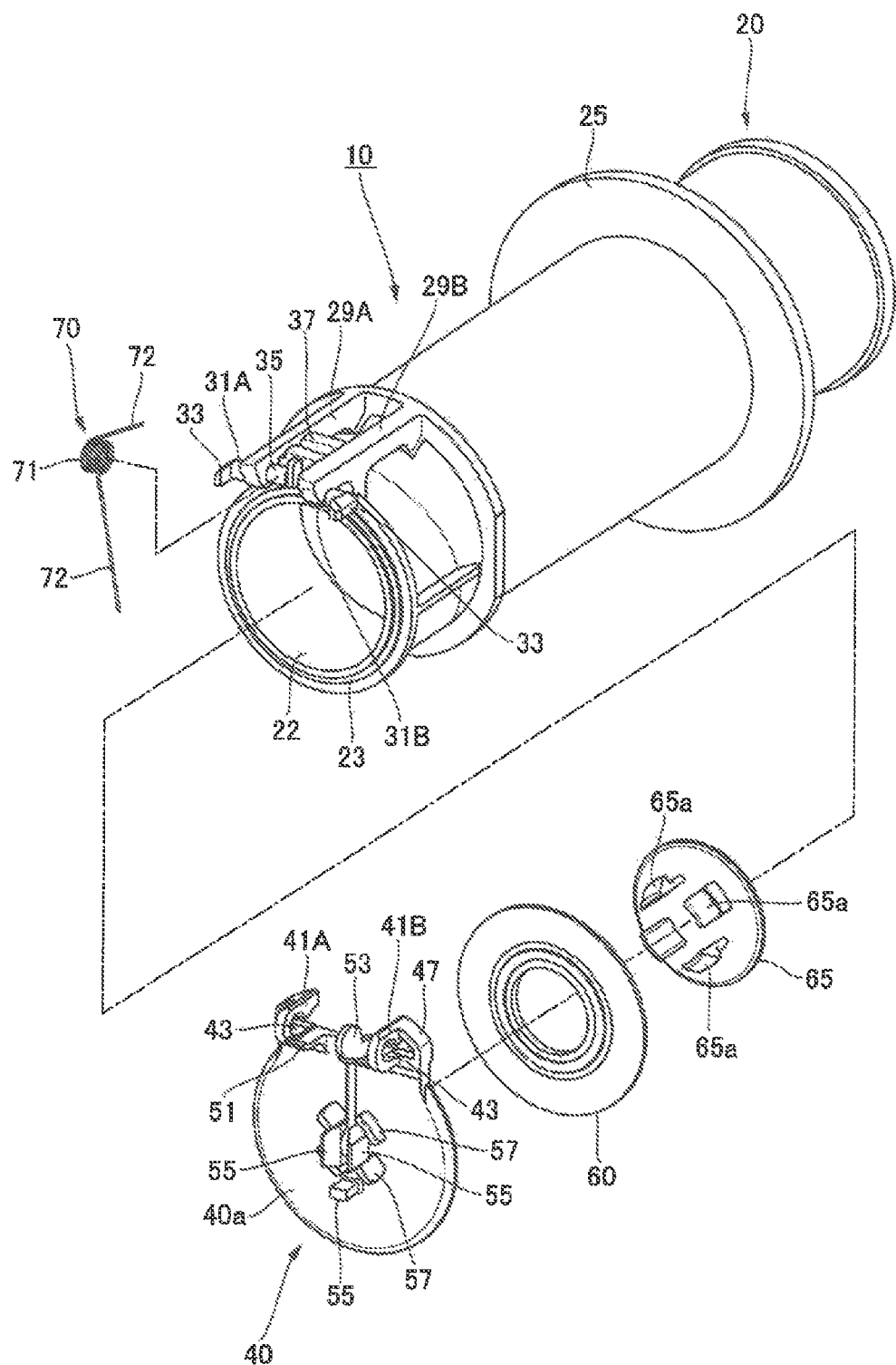
FIG. 1 is an exploded perspective view of a flap valve device according to one embodiment of the present invention.

Hereinafter, a flap valve device according to one embodiment of the present invention will be described referring to the drawings.

Figure 6:
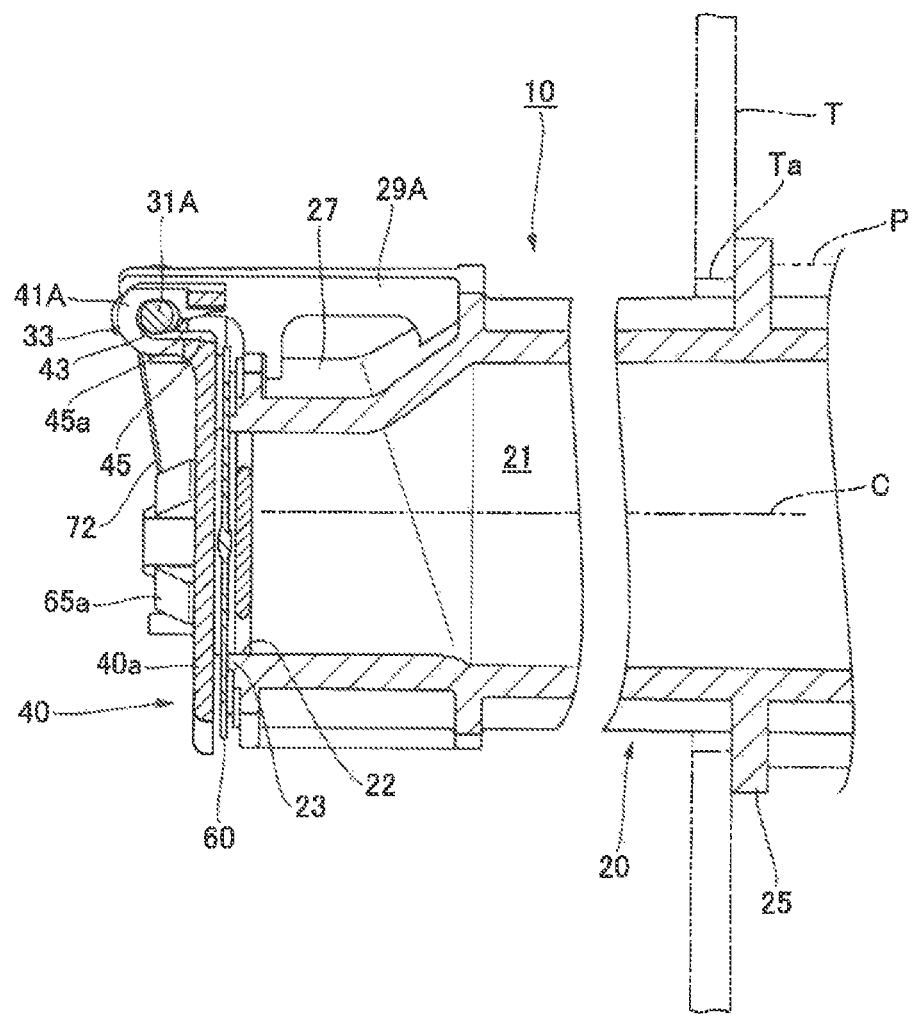
FIG. 6 is a cross-sectional view of the flap valve device showing the state where the valve element is closed.

As shown in FIG. 6, a flap valve device 10 according to the present embodiment (hereinafter, referred to as the "valve device 10") is used as a check valve for preventing backflow of fuel. The valve device 10 is mounted on the downstream side of a fuel injection pipe P (hereinafter, referred to as the "pipe P") for injecting fuel into a fuel tank T, and arranged to let the fuel, which had been injected into the pipe P from an oil injection port on the upstream side of the pipe, flow into the fuel tank through the pipe P, while having the function of preventing the fuel, which had flowed into the fuel tank, from flowing back toward the pipe P. In the following description, the "upstream side" and the "downstream side" refer to the directions in which fuel flows. To be specific, the side where the valve device 10 is disposed in the pipe P is referred to as the downstream side while the side where the oil injection port is connected in the pipe P (the opposite side from the side where the valve device 10 is disposed) is referred to as the upstream side.

As shown in FIG. 1, the valve device 10 according to the present embodiment includes a main body 20 having a cylindrical shape and including a liquid flow passage 21 formed inside (see FIG. 6), a valve element 40 having a flap shape and attached in an openable and closable manner to a one-end opening portion 22 of the main body 20, and a spring member 70 arranged to normally urge the valve element 40 in a closing direction toward the one-end opening portion 22 of the main body 20. The spring member 70 includes a coil portion 71, and a pair of leg portions 72 and 72 extending from both the ends of the coil portion 71.

Firstly, the main body 20 will be described.

As shown in FIGS. 1 and 6, the main body 20 according to the present embodiment is open both on the upstream side and on the downstream side, and has an approximately circular cylindrical shape and includes the flow passage 21 formed inside. In the main body 20, the opening portion on the downstream side defines the one-end opening portion 22, to which the valve element 40 is attached, and the peripheral rim of the one-end opening portion 22 slightly protrudes, the protruding portion defining a valve seat 23 which the valve element 40 abuts on and separates from.

An annular flange portion 25 protrudes from a portion on the outer periphery of the main body 20, the portion being closer to the opening portion on the upstream side of the main body 20. The main body 20 is inserted into a mounting hole Ta of the fuel tank T to weld the flange portion 25 to the rim on the top side of the mounting hole Ta, whereby the main body 20 is, eventually the valve device 10 is, mounted on the fuel tank T, as shown in FIG. 6.

The main body 20 may be mounted on the fuel tank T via a separate mounting member.

Figure 2:
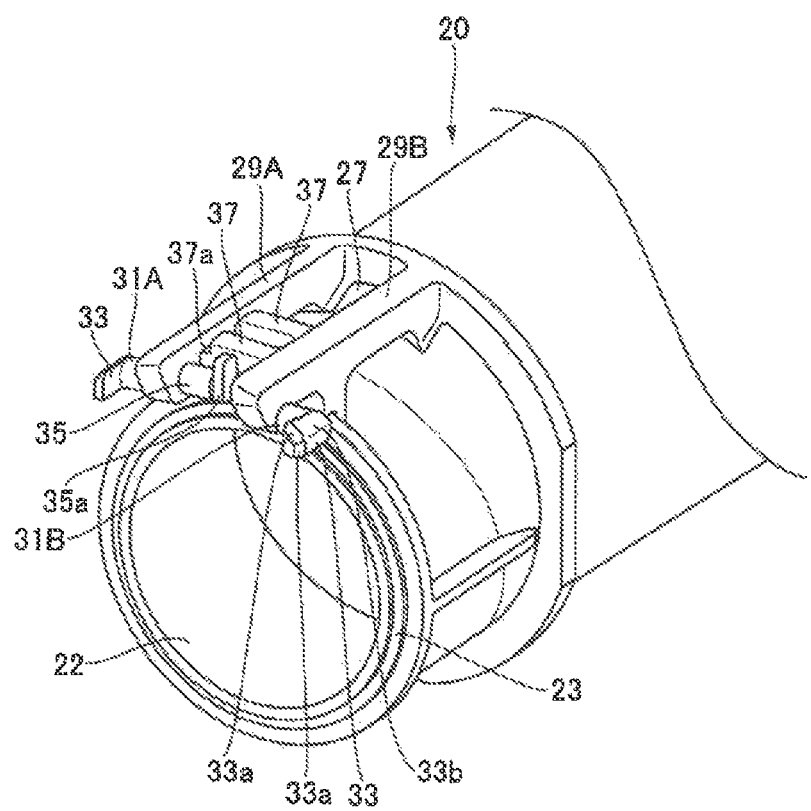
FIG. 2 is an enlarged perspective view of relevant components of a main body that constitutes the flap valve device.

A seat portion 27 having a tapered shape of gradually reducing in diameter toward the one-end opening portion 22 is provided to a portion of a peripheral wall of the end on the downstream side of the main body 20 as shown in FIGS. 2 and 6. A pair of attaching arms 29A and 29B that are parallel to each other having a predetermined space therebetween extend from the seat portion 27 toward the one-end opening portion 22, and the distal ends of the attaching arms 29A and 29B protrude a predetermined length out of the one-end opening portion 22.

A pair of supporting shafts 31A and 31B having a cylindrical columnar shape protrude from the outer surface sides of the pair of the attaching arms 29A and 29B (the opposite sides to the surfaces where the arms face to each other) as shown in FIG. 2. The pair of supporting shafts 31A and 31B are inserted into bearing holes 43 and 43 of a pair of bearing portions 41A and 41B of the valve element 40 to be described later (see FIGS. 3A and 3B), respectively, to pivotally support the valve element 40 in an openable and closable manner (see FIGS. 5 to 7).

The pair of the attaching arms 29A and 29B and the pair of bearing portions 41A and 41B are disposed on the upper side when the valve device 10 is mounted on the fuel tank T via the flange portion 25 (see FIG. 6).

Figure 3A:
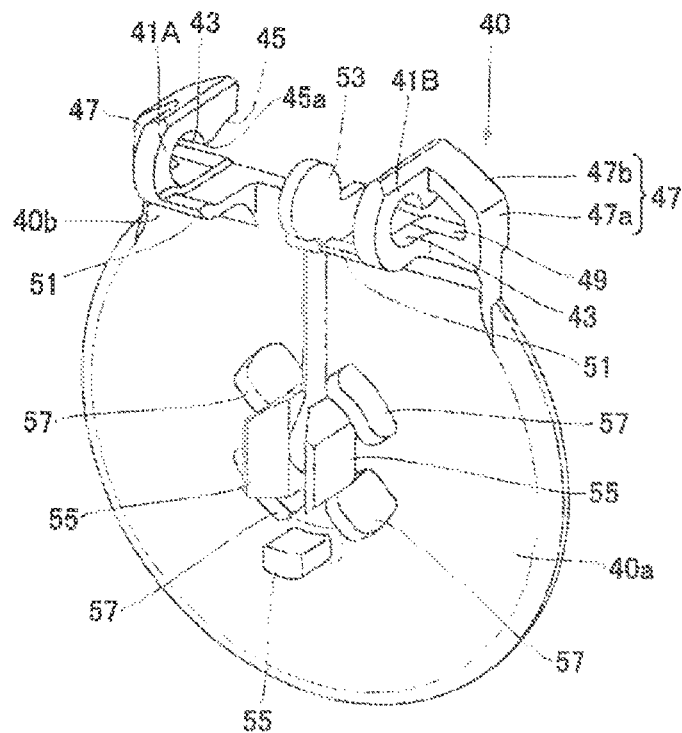
FIGS. 3A and 3B are views of a valve element that constitutes the flap valve device.
Figure 3B:
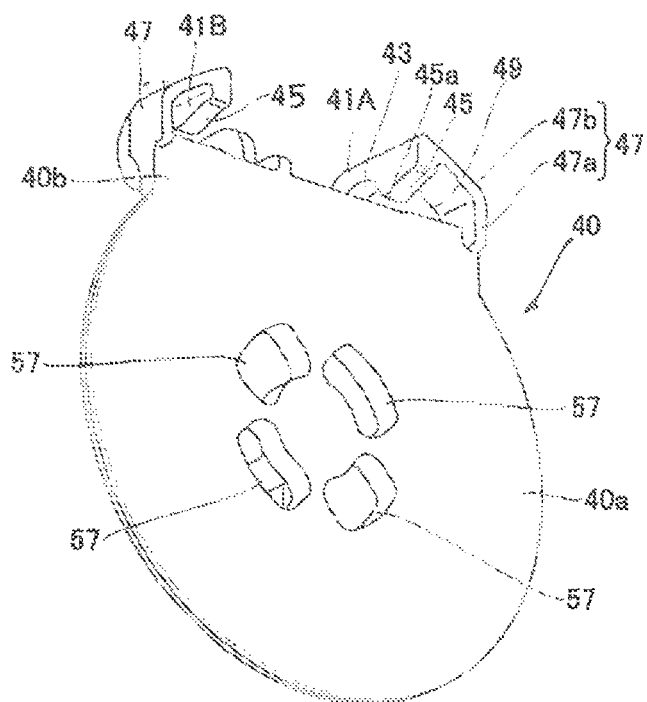
Figure 4:
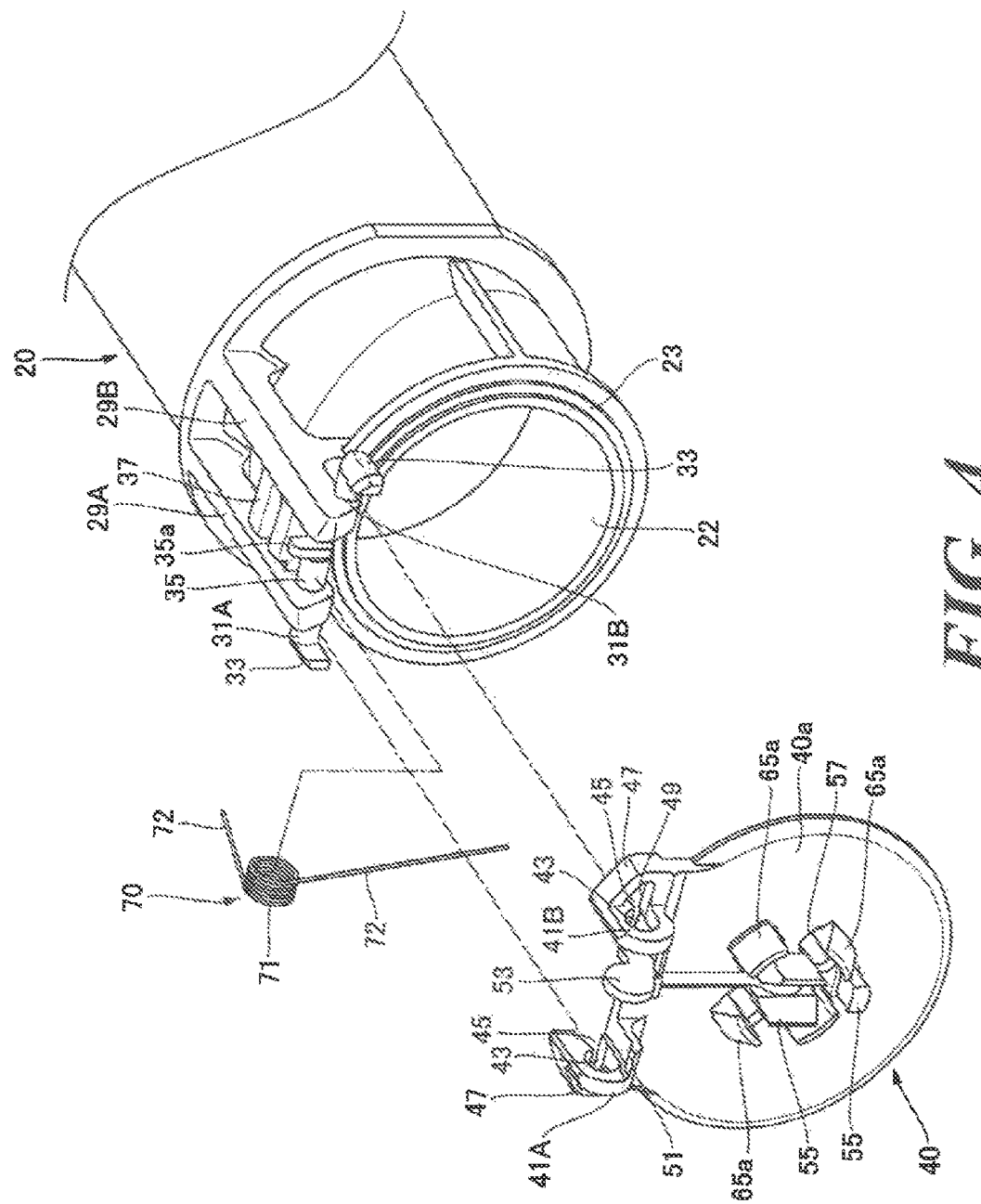
FIG. 4 is a perspective view of the flap valve device showing the state where the valve element is to be attached to the main body.
Figure 5:
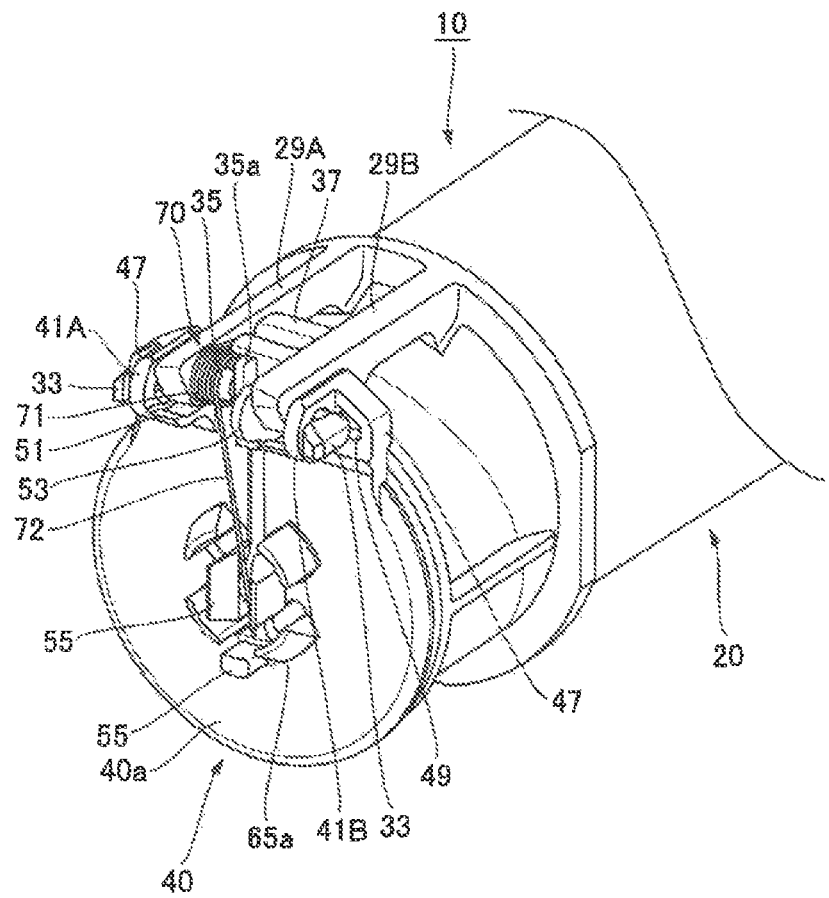
FIG. 5 is an enlarged perspective view of relevant components of the flap valve device showing the state where the valve element is closed.

The supporting shafts 31A and 31B include protruding portions 33 and 33 protruding from their distal ends, and the protruding portions 33 and 33 are disposed at the distal ends of the pair of bearing portions 41A and 41B of the valve element 40 to protrude in the radial outer directions of the bearing holes 43 as shown in FIG. 2 and FIGS. 4 to 6. The protruding portions 33 extend in the axial direction of the main body 20 and to the downstream side of the flow passage 21 as shown in FIGS. 5 and 6. Each protruding portion 33 is provided with a tapered surface 33a at its distal end and a tapered surface 33b on its upper surface as shown in FIG. 2, whereby the protruding portions 33 and 33 are made to be easily inserted into gaps 49 and 49 provided between the bearing portions 41A and 41B and band-shaped portions 47 and 47 to be described later (see FIGS. 3A, 3B and 4).

A spring supporting portion 35 arranged to support the coil portion 71 of the spring member 70 protrudes from the inner surface side of one of the bearing portion 31A, and a retaining piece 35a arranged to retain the coil portion 71 extends from the distal end of the spring supporting portion 35, as shown in FIG. 2. Two coupled ribs 37 and 37 are coupled to each other between the pair of attaching arms 29A and 29B to reinforce both the arms 29A and 29B as shown in FIGS. 2, 4, and 5. A spring engagement groove 37a with which one of the leg portions 72 of the spring member 70 is engaged is provided to each of the coupled ribs 37 and 37 on one lateral sides thereof (see FIG. 2).

Next, the valve element 40 attached in an openable and closable manner to the main body 20 having the above-described configuration will be described.

The valve element 40 has the shape conforming to the one-end opening portion 22 of the main body 20, and includes a valve main body 40a arranged to open and close the one-end opening portion 22 of the main body 20 as shown in FIGS. 3A, 3B, 4, and 9. The valve main body 40a according to the present embodiment has a circular plate shape slightly larger than the valve seat 23 provided to the one-end opening portion 22 of the main body 20. The valve main body 40a defines the "main body of the valve element" of the present invention.

A plate portion 40b having a predetermined width extends in the radial outer direction from a predetermined portion in the circumferential direction of the valve main body 40a (see FIG. 3B), and the pair of bearing portions 41A and 41B into which the pair of supporting shafts 31A and 31B are inserted are disposed on slightly inner sides in the valve main body than both the sides in the width direction of the plate portion 40b (see FIG. 3A).

Each of the bearing portions 41A and 41B in the present embodiment has an approximately frame shape of the letter U that is open to a seal surface side of the valve element 40 as a whole as shown in FIGS. 3A, 3B and 6. In the present invention, the "seal surface side" means the side of a surface of the valve element 40, the surface abutting on and separating from the one-end opening portion of the main body 20, that is, the side of a surface of the valve element 40 that abuts on and separates from the valve seat 23 (the rear surface side of the valve element).

The bearing portions 41A and 41B include bearing holes 43 and 43. As shown in FIGS. 6 and 8A to 8E, when seen from the axial directions of the supporting shafts 31A and 31B of the main body 20, the supporting shafts 31A and 31B are inserted into the bearing holes 43 and 43 to be supported, and the bearing holes 43 and 43 have an inside diameter larger than the outside diameters of the supporting shafts 31A and 31B. Each of the bearing holes 43 according to the present embodiment has a long hole shape having a long axis in the axial direction of the main body 20, both the ends of the long hole in the axial direction being rounded like an arc, when seen from the axial direction of the supporting shaft in a state where the one-end opening portion 22 of the main body 20 is closed with the valve element 40 (see FIGS. 6 and 8A to 8E). The bearing holes 43 may have other shapes than a long hole shape, and the shape is not particularly limited.

Figure 8A:
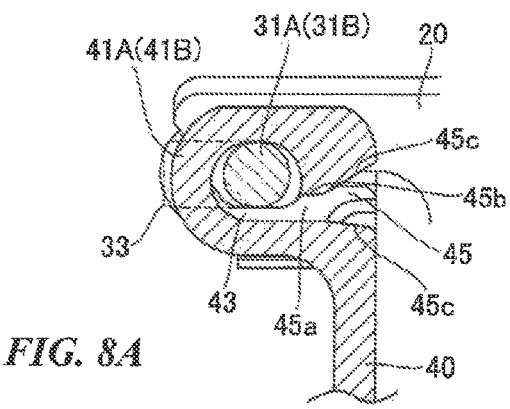
FIGS. 8A to 8E are views of the flap valve device showing operating states of the valve element.

As a result of having the bearing holes 43 as described above, the valve element 40 naturally falls down under its own weight in a state where the supporting shafts 31A and 31B are inserted into the bearing holes 43 and 43 and the valve element 40 is pivotally supported so as to be rotationally movable while the one-end opening portion 22 of the main body 20 is closed with the valve element 40, whereby the outer peripheries of the supporting shafts 31A and 31B abut on the inner peripheries in the middles of the upper portions of the bearing holes 43 and 43, as shown in FIGS. 6 and 8A.

The bearing portions 41A and 41B include, in addition to the bearing holes 43, lead grooves 45 and 45 that are open to the seal surface side of the valve element 40 when seen from the axial directions of the supporting shafts 31A and 31B, as shown in FIGS. 6 and 8A to 8E. The lead grooves 45 are in communication with the bearing holes 43 via communicating passages, the communicating passages having a width smaller than the outside diameters of the supporting shafts 31A and 31B while having a diameter that is enlarged elastically to allow the supporting shafts 31A and 31B to be introduced into the bearing holes 43.

Openings 45a that are open to the bearing holes 43 are provided to the lead grooves 45 at the positions that are closer to an axial center C of the main body 20 (see FIG. 6) on the seal surface side of the valve element 40 when seen from the axial directions of the supporting shafts 31A and 31B, as shown in FIGS. 6 and 8A to 8E. The portions of the lead grooves 45 where the openings 45a are disposed form narrow portions 45b that narrow the inside diameters of the lead grooves 45. Tapered surfaces 45c are further provided to the lead grooves 45, the tapered surfaces 45c being gradually open from the narrow portions 45b toward the opening rims on the seal surface side, whereby the supporting shafts 31A and 31B are made to be easily introduced into the lead grooves 45.

In the bearing portions 41A and 41B, one ends of the opening portions on the seal surface side of the lead grooves 45 are coupled to the valve main body 40a to define fixed ends while the other ends of the opening portions on the seal surface side of the lead grooves 45 extend separate from the valve main body 40a to define free ends (see FIG. 3A).

The bearing portions 41A and 41B include band-shaped portions 47 and 47 that couple the valve main body 40a in the vicinity of the bearing portions 41A and 41B to the other ends (free ends) of the bearing portions 41A and 41B, as shown in FIGS. 3A and 3B.

Figure 7:
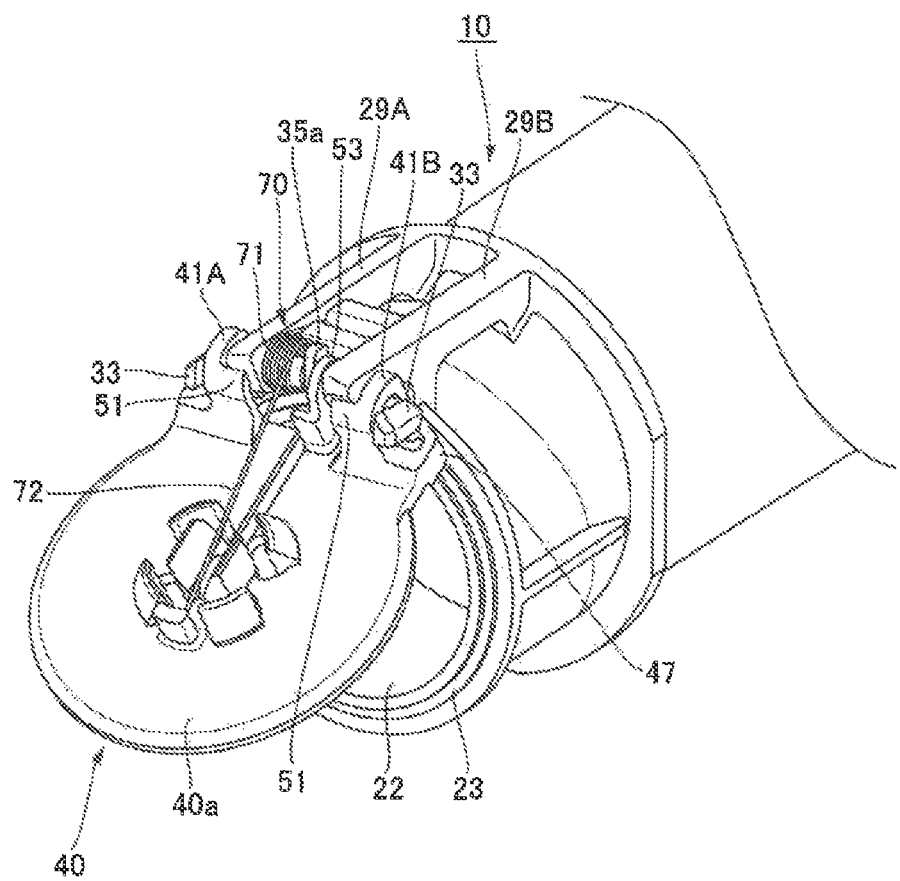
FIG. 7 is an enlarged perspective view of relevant components of the flap valve device showing the state where the valve element is opened.
Figure 9:
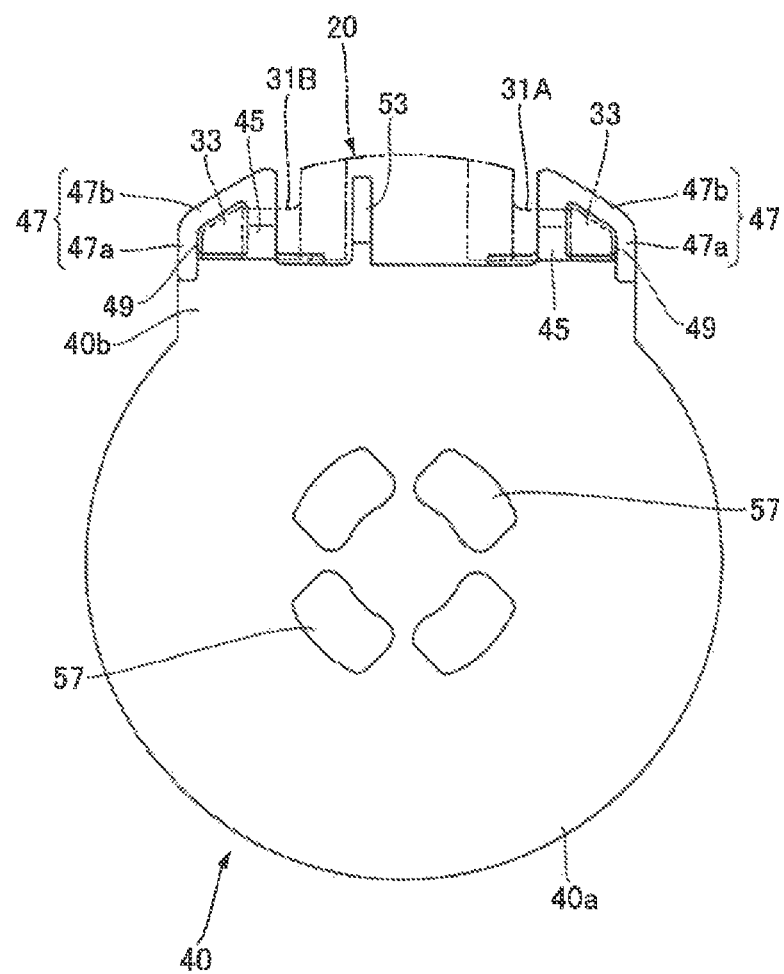
FIG. 9 is a back view of the valve element that constitutes the flap valve device.

The band-shaped portions 47 and 47 according to the present embodiment have a curved shape so as not to obstruct insertion of the supporting shafts 31A and 31B of the main body 20 into the lead grooves 45 and 45 of the bearing portions 41A and 41B when seen from the seal surface side of the valve element 40 as shown in FIG. 9, while the band-shaped portions 47 and 47 are arranged such that the protruding portions 33 and 33 do not come off from the band-shaped portions 47 and 47 when the valve element 40 rotationally moves in the opening direction as shown in FIG. 7.

The band-shaped portions 47 and 47 have a curved shape in the present embodiment, the band-shaped portions may have a linear shape. The shape of the band-shaped portions is not particularly limited as long as it does not obstruct insertion of the bearing portions into the lead grooves.

The band-shaped portions 47 and 47 according to the present embodiment include base portions 47a protruding from the lateral sides of the plate portion 40b toward the outside of the valve element, and inclined portions 47b extending obliquely from the distal ends of the base portions 47a toward the free ends of the bearing portions 41A and 41B, and thus have the shape conforming to the protruding portions 33 including the tapered surfaces 33a and 33b provided to the main body 20 (see FIG. 2) as shown in FIGS. 3 and 9. The gaps 49 and 49 are provided between the bearing portions 41A and 41B and the band-shaped portions 47 and 47, and the protruding portions 33 and 33 of the main body 20 are inserted to pass through the gaps 49 and 49. The band-shaped portions 47 and 47 are made to be placed under the protruding portions 33 and 33 when the valve element 40 rotationally moves in the opening direction as shown in FIG. 7, whereby the protruding portions 33 and 33 are made not to come off from the band-shaped portions 47 and 47.

While the band-shaped portions 47 and 47 according to the present embodiment couple the valve main body 40a to the other ends of the bearing portions 41A and 4B, the present invention is not particularly limited thereto, and the band-shaped portions may couple one ends of the bearing portions to the other ends of the bearing portions.

Rotational movement restricting pieces 51 and 51 are provided to the plate portion 40b at positions adjacent to the inner surface sides (the opposed surface sides) of the pair of bearing portions 41A and 41B as shown in FIG. 3A, and are arranged to, when the valve element 40 opens to a maximum extent, abut on the distal ends of the pair of the attaching arms 29A and 29B of the main body 20 to restrict the opening angle of the valve element 40 as shown in FIG. 7.

A spring falling prevention piece 53 is provided to the plate portion 40b at the position adjacent to the rotational movement restricting piece 51 on the side of the bearing portion 41B as shown in FIG. 3A. The spring falling prevention piece 53 is, when the valve element 40 is attached to the main body 20, disposed between the retaining piece 35a of the spring supporting portion 35 of the main body 20 and the attaching arm 29B as shown in FIG. 5, and thus the coil portion 71 of the spring member 70 is arranged to abut on the spring falling prevention piece 53 to be prevented from coming off even if the coil portion 71 surmounts the retaining piece 35a of the spring supporting portion 35.

Spring holding walls 55 arranged to hold the other leg portion 72 of the spring member 70 protrude from the center portion of the valve element 40 on the side opposite to the seal surface of the valve element 40 as shown in FIG. 3A. Engagement holes 57 are provided to the valve element 40 around the spring holding walls 55 (see FIGS. 3A and 3B).

While the bearing portions 41A and 41B of the valve element 40 described above have an approximately frame shape of the letter U, the present invention is not limited thereto as long as each bearing portion includes a bearing hole and a lead groove that is open to the seal surface side of the valve element.

As shown in FIG. 1, a sealing member 60 having a thin annular shape made from rubber or an elastomer is disposed on the seal surface side of the valve element 40, and a fixing member 65 is disposed on the back surface side thereof. Engagement pawls 65a protruding from the fixing member 65 are made to pass through the center penetrating portion of the sealing member 60 to be engaged with the engagement holes 57 of the valve element 40 (see FIG. 4), whereby the sealing member 60 is sandwiched between the valve element 40 and the fixing member 65 (see FIG. 6). The outer rim of the sealing member 60 abuts on the valve seat 23, whereby the one-end opening portion 22 of the main body 20 is sealed in the closed state, as shown in FIG. 6. The seal surface side of the valve element 40 may be made to abut directly on the valve seat 23 of the main body 20 without providing the sealing member 60, and the present invention is not limited particularly.

The main body 20 that constitutes the above-described valve device 10 is preferably made from a synthetic resin such as polyethylene (PE) from the viewpoint of welding properties to the fuel tank T. The valve element 40 is preferably made from a synthetic resin such as polyoxymethylene (POM) and polyamide (PA) that are hardly swollen with fuel even if soaked with fuel.

Next, the assembly procedures and the operation and advantageous effect of the valve device 10 according to the present invention that has the above-described configuration will be described.

First, the coil portion 71 of the spring member 70 is externally fitted to the spring supporting portion 35 of the main body 20, and one of the leg portions 72 of the spring member 70 is engaged with the spring engagement groove 37a of the main body 20 while the other leg portion 72 is engaged with the side of the valve element 40 that is opposite to the seal surface (with the front surface side).

In this state, the bearing portions 41A and 41B of the valve element 40 are aligned with the supporting shafts 31A and 31B of the main body 20 while the gaps 49 and 49 provided to the valve element 40 are aligned with the protruding portions 33 and 33 of the main body 20, and the valve element 40 is pushed against the main body 20 as shown in FIG. 4.

Then, the supporting shafts 31A and 31B are introduced into the lead grooves 45 and 45 of the bearing portions 41A and 41B via the tapered surfaces 45c (see FIGS. 8A to 8E) while the protruding portions 33 and 33 are inserted into the gaps 49 and 49.

When the valve element 40 is further pushed in, and the supporting shafts 31A and 31B pass through the narrow portions 45b and 45b, the narrow portions 45b and 45b are pressed from the inside, and the free ends of the bearing portions 41A and 41B are bent to be deformed so as to expand outward, whereby the lead grooves 45 are elastically enlarged in diameter. Then, when the supporting shafts 31A and 31B pass through the openings 45a and 45a to be introduced into the bearing holes 43 and 43, the bearing portions 41A and 41B flexibly return to make the lead grooves 45 and 45 reduced in diameter while the protruding portions 33 and 33 pass through the gaps 49 and 49 to be disposed outside the bearing portions 41A and 41B. As a result, the valve element 40 can be attached in an openable and closable manner to the main body 20 as shown in FIGS. 5 and 6.

As described above, since the valve device 10 has the configuration that the supporting shafts 31A and 31B are provided to the main body 20 while the lead grooves 45 and 45 provided to the bearing portions 41A and 41B of the valve element 40 are open to the seal surface side of the valve element 40, the simple operation of aligning the bearing portions 41A and 41B with the supporting shafts 31A and 31B and then pushing the valve element 40 against the main body 20 allows the valve element 40 to be attached to the main body 20, whereby the attaching workability of the valve element 40 with respect to the main body 20 can be improved.

At this time, the band-shaped portions 47 and 47 have a shape such that the protruding portions 33 and 33 of the main body 20 can pass through the gaps 49 and 49 provided between the bearing portions 41A and 41B and the band-shaped portions 47 and 47 when seen from the seal surface side of the valve element 40 in the present embodiment as shown in FIG. 3B. Thus, the protruding portions 33 and 33 can be made to pass through the gaps 49 and 49 provided between the bearing portions 41A and 41B and the band-shaped portions 47 and 47 when the supporting shafts 31A and 31B are inserted into the bearing holes 43 and 43 through the lead grooves 45 and 45 from the seal surface side of the valve element 40, whereby the valve element 40 can be smoothly attached to the main body 20.

Since the valve device 10 has the configuration that the supporting shafts 31A and 31B are provided to the main body 20 while the bearing holes 43 and 43 are provided to the valve element 40, even when, for example, the main body 20 is made from polyethylene or the like that is easily swollen with fuel while the valve element 40 is made from polyoxymethylene or the like that is hardly swollen with fuel, and the main body 20 is soaked with fuel to have the supporting shafts 31A and 31B swollen, the bearing holes 43 and 43 provided to the bearing portions 41A and 41B can be prevented from being expanded from the inside, and can prevent the supporting shafts 31A and 31B from coming off from the bearing holes 43 and 43 since the bearing holes 43 and 43 have an inside diameter larger than the outside diameters of the supporting shafts 31A and 31B.

In a state where the valve element 40 is attached to the main body 20 as shown in FIGS. 5 and 6, the sealing member 60 is made to abut on the valve seat 23 by the urging force of the spring member 70 to seal the one-end opening portion 22 of the main body 20 in a closed state. In this state, the valve element 40 falls down under its own weight, whereby the outer peripheries of the supporting shafts 31A and 31B abut on the inner peripheries in the middles of the upper portions of the bearing holes 43 and 43 as described above (see FIG. 8A).

Figure 8B:
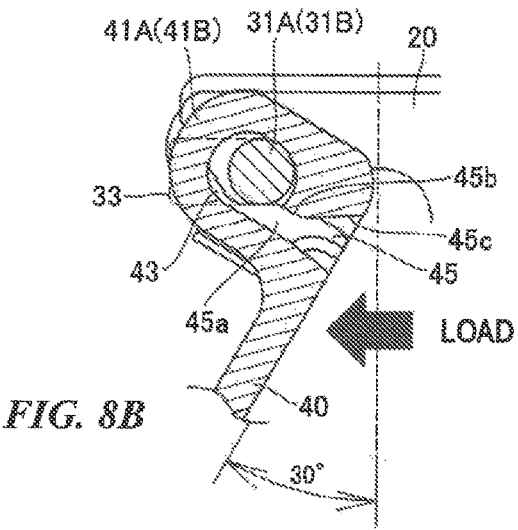

Then, when fuel is supplied from the pipe P (see FIG. 6), the valve element 40 rotationally moves via the bearing holes 43 and 43 around the supporting shafts 31A and 31B against the urging force of the spring member 70. At this time, a load is imposed on the valve element 40 in the axial direction of the main body 20 that defines the direction in which the fuel flows. In the valve device 10, since the openings 45a that are open to the bearing holes 43 are provided to the lead grooves 45 at the positions that are closer to the axial center C of the main body 20 (see FIG. 6) on the seal surface side of the valve element 40 when seen from the axial directions of the supporting shafts 31A and 31B, the supporting shafts 31A and 31B abut on the inner peripheries of the bearing holes 43 and 43 in the range from the middles of the upper portions to the right sides in FIGS. 8A to 8E in accordance with the opening angles of the valve element 40 as shown in FIGS. 8B and 8C.

Figure 8D:
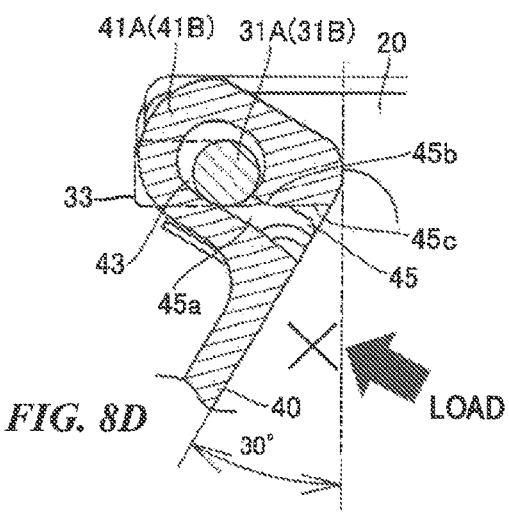
Figure 8C:
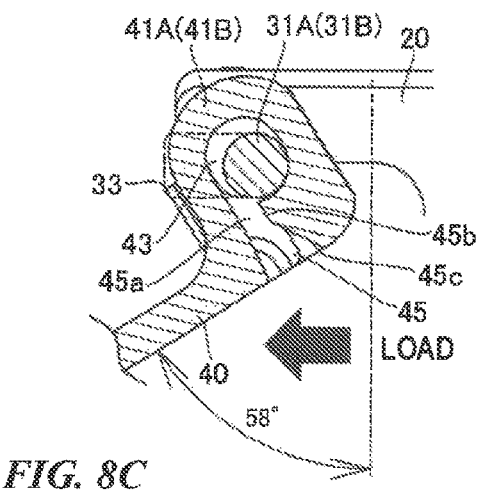
Figure 8E:
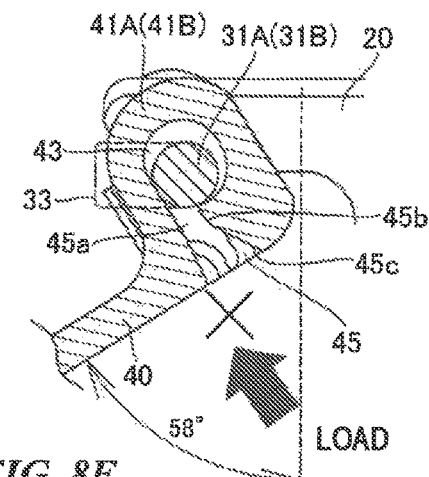

The load on the valve element 40 is not imposed from the bottom toward the obliquely upper side as shown in FIGS. 8D and 8E, so that the supporting shafts 31A and 31B are hardly pushed against the openings 45a of the lead grooves 45 that are open to the bearing holes 43. Even if the valve device 10 is brought into the state shown in FIGS. 8D and 8E when the vehicle sways or the like, the openings 45a of the lead grooves 45, which form the narrow portions 45b, have a configuration such that the supporting shafts 31A and 31B cannot easily get thereinto.

Since the bearing holes 43 and 43 provided to the bearing portions 41A and 41B have a long hole shape having the long axis in the axial direction of the main body 20 when seen from the axial directions of the supporting shafts in a state where the one-end opening portion 22 of the main body 20 is closed with the valve element 40 in the present embodiment (see FIGS. 6 and 8A to 8E), even if the sealing member 60 for improving the sealing properties to the one-end opening portion 22 of the main body 20 is attached on the seal surface side of the valve element 40, the valve element 40 can be displaced by a plate thickness of the sealing member 60 in the axial direction of the main body 20, whereby the posture of the valve element 40 can be stabilized to maintain the sealing properties of the valve element 40 to the one-end opening portion 22 of the main body 20.

Further, in the present embodiment, since in the bearing portions 41A and 41B, one ends of the opening portions of the lead grooves 45 are coupled to the valve main body 40a while the other ends of the opening portions of the lead grooves 45 are separate from the valve main body 40a, and the band-shaped portions 47 and 47 that couple the valve main body 40a to the other ends of the bearing portions 41A and 41B are provided, the band-shaped portions 47 and 47 having a curved shape so as not to obstruct insertion of the supporting shafts 31A and 31B into the lead grooves 45 and 45 when seen from the seal surface side of the valve element 40 (see FIG. 9), the bearing portions 41A and 41B can be prevented from being deformed, whereby the supporting shafts 31A and 31B can be more effectively prevented from coming off from the lead grooves 45 and 45.

Since the protruding portions 33 and 33 disposed outside the pair of bearing portions 41A and 41B are provided to the pair of the supporting shafts 31A and 31B in the present embodiment as shown in FIG. 5, the protruding portions 33 and 33 abut on the outside of the bearing portions 41A and 41B to make the supporting shafts 31A and 31B hardly come off from the bearing holes 43 and 43 even if the valve element 40 is displaced in the direction intersecting with the axial center C of the main body 20. Since the protruding portions 33 and 33 have the configuration of not coming off from the band-shaped portions 47 and 47, the supporting shafts 31A and 31B can be made to hardly come off from the bearing holes 43 and 43 even when the valve element 40 rotationally moves in its opening direction as shown in FIG. 7.

Further, in the present embodiment, since the protruding portions 33 and 33 extend in the axial direction of the main body 20 and to the downstream side of the flow passage 21 as shown in FIGS. 5 and 6, the gaps 49 and 49 can be made relatively small, the gaps 49 and 49 being provided between the bearing portions 41A and 41B and the band-shaped portions 47 and 47, through which the protruding portions 33 and 33 are made to pass when the supporting shafts 31A and 31B of the main body 20 are inserted into the bearing holes 43 and 43 through the lead grooves 45 and 45 from the seal surface side of the valve element 40, and the band-shaped portions 47 and 47 can be made shorter, whereby the bearing portions 41A and 41B can be improved in strength.

DESCRIPTION OF REFERENCE NUMERALS AND SIGNS

10 Flap valve device (valve device)
20 Main body portion
21 Flow passage
22 One-end opening portion
31A, 31B Supporting shaft
40 Valve element
41A, 41B Bearing portion
43 Bearing hole
45 lead groove
45a Communicating passage
47 band-shaped portion
49 Gap
70 Spring member

The invention claimed is:
1. A flap valve device including:
a cylindrical-shaped main body including a liquid flow passage formed thereinside;
a flap-shaped valve element attached in an openable and closable manner to a one-end opening portion of the cylindrical-shaped main body; and
a spring member arranged to normally urge the valve element in a closing direction toward the one-end opening portion of the cylindrical-shaped main body,
wherein the cylindrical-shaped main body includes
a supporting shaft arranged to pivotally support the valve element in an openable and closable manner,
wherein the valve element includes
a bearing portion into which the supporting shaft is inserted,
wherein the bearing portion includes
a bearing hole into which the supporting shaft is inserted to be supported, and which has an inside diameter larger than an outside diameter of the supporting shaft, when seen from an axial direction of the supporting shaft, and
a lead groove having an opening portion open to a seal surface side of the valve element, and being in communication with the bearing hole via a passage, the passage having a width smaller than the outside diameter of the supporting shaft and being elastically expandable to thereby allow the supporting shaft to be introduced into the bearing hole, and
wherein the opening portion of the lead groove for the bearing hole is positionally shifted toward an axial center of the cylindrical-shaped main body with respect to an axial center of the bearing hole when seen from the axial direction of the supporting shaft in a state where the one-end opening portion of the cylindrical-shaped main body is closed with the valve element,
wherein one end of the bearing portion around the opening portion of the lead groove is coupled to a main body of the valve element, and the other end of the bearing portion around the opening portion of the lead groove is disposed so as to be separated from the main body of the valve element rather than the one end of the bearing portion,
wherein there is provided a band-shaped portion that extends from the one end of the bearing portion or the main body of the valve element and is coupled to the other end of the bearing portion, and
wherein the band-shaped portion extends from the bearing portion outward in a radial direction of the valve element so as not to obstruct an insertion of the supporting shaft into the lead groove when seen from the seal surface side of the valve element.
2. The flap valve device of claim 1,
wherein the supporting shaft of the cylindrical-shaped main body includes a pair of supporting shafts,
wherein the bearing portion of the valve element includes a pair of bearing portions into which the pair of supporting shafts are inserted,
wherein the pair of supporting shafts include protruding portions that are disposed outside of the pair of bearing portions and protrude in radial outer directions with respect to the bearing hole, and
wherein the band-shaped portion is shaped to allow the protruding portions pass therethrough when seen from the seal surface side of the valve element, and to prevent the protruding portions from coming off therefrom when the valve element rotationally moves in an opening direction.

3. The flap valve device of claim 2,
wherein the protruding portions extend in an axial direction of the cylindrical-shaped main body toward a downstream side of the liquid flow passage.

4. The flap valve device of claim 1,
wherein the bearing hole has a long hole shape with a long axis in an axial direction of the cylindrical-shaped main body when seen from the axial direction of the supporting shaft in the state where the one-end opening portion of the cylindrical-shaped main body is closed with the valve element.

5. The flap valve device of claim 1,
wherein, in the state where the one-end opening portion of the cylindrical-shaped main body is closed with the valve element,
the valve element naturally falls down under its own weight,
an outer periphery of the supporting shaft abuts on an upper portion of an inner periphery of the bearing hole, and
the outer periphery of the supporting shaft does not abut on a lower portion of the inner periphery of the bearing hole.

6. The flap valve device of claim 1, wherein the supporting shaft is provided on an exterior surface of the cylindrical-shaped main body.

7. The flap valve device of claim 1, wherein the supporting shaft is exposed from the liquid flow passage of the cylindrical-shaved main body.

8. The flap valve device of claim 1, wherein the cylindrical-shaped main body further includes a seat portion having a tapered shape of reducing in diameter toward the one-end opening portion of the cylindrical-shaped main body is provided to a portion of the outer circumferential surface of the end on the downstream side of the cylindrical-shaped main body, and
wherein an attaching arm extends from the seat portion toward the one-end opening portion, the supporting shaft being arranged at a distal end of the attaching arm.

9. The flap valve device of claim 8, wherein the distal end of the attaching arm protrudes a predetermined length past the one-end opening portion.

10. The flap valve device of claim 1, wherein the main body of the valve element includes a plate portion having a predetermined width extending in a radial outer direction from a predetermined portion in a circumferential direction of the main body of the valve element, and
wherein the bearing portion into which the supporting shaft is inserted is disposed on an inner side in the main body of the valve element in relation to sides in a width direction of the plate portion.

11. The flap valve device of claim 1, wherein the valve element is supported on the supporting shaft by a force of a weight of the valve element.

12. The flap valve device of claim 1, wherein the opening portion of the lead groove where an opening is disposed forms a narrow portion that narrows an inside diameter of the lead groove.

13. The flap valve device of claim 12, wherein a tapered surface is provided to the lead groove, the tapered surface being open from the narrow portion toward the seal surface side.

14. The flap valve device of claim 1, wherein the band-shaped portion includes a curved shape so as not to obstruct the insertion of the supporting shaft into the lead groove when seen from the seal surface side of the valve element, while the band-shaped portion is arranged such that a protruding portion does not come off from the band-shaped portion when the valve element rotationally moves in an opening direction.

15. The flap valve device of claim 1, wherein the band-shaped portion includes:
a base portion protruding from a lateral side of a plate portion of the cylindrical-shaped main body toward the outside of the valve element; and
an inclined portion extending obliquely from a distal end of the base portion toward a free end of the bearing portion.

16. The flap valve device of claim 1, wherein a gap is provided between the bearing portion and the band-shaped portion, and
wherein a protruding portion of the cylindrical-shaped main body is inserted to pass through the gap.

17. The flap valve device of claim 1, wherein the supporting shaft is arranged outside of an outer circumferential surface of the cylindrical-shaped main body outside of the liquid flow passage to pivotally support the valve element in the openable and closable manner.

* * * * *